United States Patent Office 3,317,495
Patented May 2, 1967

3,317,495
EMULSION POLYMERIZATION OF VINYL CHLORIDE WITH HYDROGEN PEROXIDE, AN ALKALI METAL FORMALDEHYDE SULFOXYLATE AND A FATTY ACID SULFATE SALT
William D. Jones, Painesville, and Steven W. Schaefer, Mentor, Ohio, assignors to Diamond Alkali Company, Cleveland, Ohio, a corporation of Delaware
No Drawing. Filed Jan. 6, 1964, Ser. No. 336,012
25 Claims. (Cl. 260—86.3)

This application is a continuation-in-part of our copending application Serial No. 169,672, filed January 29, 1962, now abandoned.

This invention relates to improvements in the aqueous emulsion polymerization of polymerizable unsaturated monomers, especially vinyl chloride, either alone, or in admixture with other unsaturated monomers polymerizable therewith. More particularly, this invention relates to improvements in the production of vinyl polymers known as paste resins. Still more particularly, this invention relates to the use, in said aqueous emulsion polymerization process, of a particular catalyst whereby the vinyl paste resins produced exhibit excellent heat stability and extremely low dispersion viscosity characteristics when subjected to both low and high shearing stress.

In order to simplify the presentation of the invention, it is desired to dispense with the use of terms such as "copolymers," "interpolymers," "terpolymers," "copolymerization," and the like. Accordingly, it is to be understood that, where the words "polymer," "polymeric," "polymerization," and the like are used, these words are to be understood to extend to and include processes and products wherein more than one monomer is employed in a polymerization reaction to form a copolymer, terpolymer, etc. For example, these terms are intended to include processes and products that employ as little as 50 percent vinyl chloride, with the remainder being one or more additional monomers to form interpolymers, including copolymers and terpolymers.

Moreover, it is likewise to be understood that, as used in the specification and claims, the term "paste resin" is intended to mean the particulate, dry polymer product which is obtained by finishing, as hereinafter described, an aqueous emulsion of said polymer previously prepared in an aqueous emulsion polymerization process. A paste resin so obtained may also be designated by such terms as "emulsion resin," "plastisol resin" and the like.

The art of preparing dispersions of various synthetic resins by the direct polymerization of polymerizable monomeric materials, for example, vinyl chloride, and mixtures thereof, with other polymerizable monomeric materials, in aqueous emulsion in the presence of an emulsifying agent, is well known. The resulting polymerization mass is in the form of a synthetic latex, from which, in the production of paste resins, the polymer is obtained in powder form by precipitation or by other suitable means, such as spray-drying. The dry resin powder may then be incorporated, with stirring, into a liquid organic material which is a plasticizer for the resin. The paste-like polymer dispersion so formed is known as a plastisol. At ordinary room temperature, this composition is fluid in the sense that it can be poured from a container, but is relatively viscous as compared with water. Upon heating the dispersion to an elevated temperature, solvation of the polymer particles by the plasticizer occurs, followed by polymer fusion. When the fused polymer mass is subsequently cooled, a substantially homogeneous body of plasticized synthetic resin is obtained.

Plastisols may be employed in various resin processing methods, such as molding, extrusion, dip-coating, spread-coating, and the like, to produce tough, durable articles or comparable coatings. To perform satisfactorily in these various applications, a plastisol and the paste resin therein should possess a number of physical characteristics which are important and desirable. Thus, properties such as initial plastisol viscosity, stability of the plastisol in the sense that it does not excessively increase in viscosity at room temperature within a reasonable period of time and stability of the resin under the effect of heat are among important characteristics. To some degree, these properties may be controlled by employing appropriate techniques in the polymerization reaction. Heretofore, however, it has not been possible to produce without considerable difficulty paste resins from which plastisols could be prepared affording all of these several characteristics to the desired degree, and at the same time.

With regard to the polymerization process, important constituents of the polymerization mixture, aside from the monomer or monomers, include the catalyst and catalyst activator used to initiate the polymerization reaction and the emulsifier which is added to prevent flocculation of the polymer. In general, a Redox catalyst system is employed. This system is well known and may be found described in many U.S. patents, as well as numerous publications. Catalyst systems which have been ordinarily used heretofore in this procedure because of their efficiency and convenience are combinations of persulfates and bisulfites, as for example, potassium persulfate and sodium metabisulfite. Such systems generally must be employed to the extent of about 0.02 to 1 percent, based upon the weight of the monomeric materials. However, persulfate-bisulfite catalysts have the disadvantage that their decomposition products formed in reaction are incorporated into the polymer molecules, enhancing the degradation of said polymer when subjected to heat.

Emulsifiers commonly employed in the process with such catalyst systems are compounds such as alkali metal salts and alkali metal ether salts of long-chain carboxylic and sulfonic acids, alkylated aromatic sulfonic acids and salts of long-chain amines. Although providing efficient emulsifying activity, these materials may likewise exert in combination with the aforementioned catalysts a deleterious effect on the heat stability of the polymer product. Additionally, plastisols prepared from these polymer products usually exhibit high initial viscosities both at high and low shearing stress, which viscosities increase rapidly as the plastisols age, upon standing.

An object of the present invention, therefore, is to provide, in combination with emulsifiers as used heretofore, a catalyst for the preparation of paste resins which will not lower the heat stability of the polymer product.

Another object of this invention is to provide, in combination with known emulsifiers, a catalyst for the preparation of paste resins whereby said paste resin products will exhibit low dispersion viscosity characteristics at low and high shearing stress.

A further object of this invention is to produce a paste resin with improved heat stability and low dispersion viscosity characteristics at both low and high shearing stress.

These and other objects will become apparent to those skilled in the art by the description of the invention which follows.

In accordance with these objects, the present invention is directed to the process for preparing paste resins from vinyl chloride monomer, or from a monomeric mixture containing at least 50 percent, by weight, of vinyl chloride, which comprises polymerizing said monomer, or monomer mixture, in an aqueous medium at a temperature of 100° to 160° F. in the presence of a hydrogen peroxide catalyst and an alkali metal formaldehyde sulfoxylate activator, e.g., sodium formaldehyde sulfoxylate and, as the emulsifier, a fatty acid sulfate salt having the formula $$R—(OR')_n OSO_3 Y$$

wherein $R'$ is a saturated aliphatic hydrocarbyl radical containing 1 to 3 carbon atoms; $n$ is an integer from 0 to 10; $R$ is an aliphatic hydrocarbyl radical containing 6 to 20 carbon atoms; and $Y$ is a cation selected from the group consisting of alkali metals, alkaline earth metals, ammonium and alkanol amines containing up to 6 carbon atoms.

By following the teachings herein, a paste resin is produced having especially excellent resistance to the effects of heat. Plastisols incorporating this paste resin exhibit, both initially and with aging, flow properties at both low and high shearing stress which are much lower than those possible with comparable dispersions of other similar-type resins.

Compounds falling within the above generic structure which are suitable for use herein as emulsifiers in combination with the hydrogen peroxide-alkali metal formaldehyde sulfoxylate catalyst system are sodium lauryl sulfate, sodium tridecyl sulfate, 2-palmitoxy ethyl sodium sulfate, 2-lauroxy ethyl sodium sulfate, 2-myristoxy ethyl sodium sulfate, 2-stearoxy ethyl sodium sulfate, 2-oleoxy ethyl sodium sulfate, 2-tridecyl ethyl sodium sulfate, 2-capryloxy ethyl sodium sulfate, 2-caproxy ethyl sodium sulfate, 2-(14-hydroxy stearoxyl)ethyl sodium sulfate; compounds otherwise similar to any of the foregoing fatty ether sulfates but where ethyl is replaced by a propyl radical; also, compounds otherwise similar to any of the foregoing fatty ether sulfates but where the organic chain portion, i.e., the R portion of the general formula $$R(OR')_n OSO_3 Y$$

is linked to the ethyl or propyl portion through an ethoxy or propoxy group which may be a mono- or poly-grouping, e.g., 2-(lauroxy ethoxy)ethyl sodium sulfate, $$(C_{12}H_{25}OCH_2CH_2OCH_2CH_2OSO_3Na)$$

2-(palmitoxy diethoxy) ethyl sodium sulfate, $$(C_{16}H_{33}OCH_2CH_2OCH_2CH_2OCH_2CH_2OSO_3Na)$$

2-(myristoxy tripropoxy)propyl sodium sulfate, $$(C_{14}H_{29}OCH_2CH_2CH_2OCH_2CH_2CH_2OCH_2$$
$$CH_2CH_2OCH_2CH_2CH_2OSO_3Na)$$

2-(lauroxy tetraethoxy) ethyl sodium sulfate, $$(C_{12}H_{25}OCH_2CH_2OCH_2CH_2OCH_2CH_2$$
$$OCH_2CH_2OCH_2CH_2OSO_3Na)$$

and compounds otherwise similar to any of the foregoing fatty ether sulfates but where sodium is replaced by potassium, calcium, barium, strontium, lithium, cesium, ammonium or alkanol amines of up to 6 carbon atoms.

Of the aforementioned emulsifiers, 2-tridecyl ethyl sodium sulfate (sodium tridecyl ether sulfate) and particularly sodium tridecyl sulfate and 2-lauroxy ethyl sodium sulfate (sodium lauryl ether sulfate) are especially preferred for use since it has been found that paste resins prepared employing these emulsifiers possess most desirable rheological characteristics. Thus, similar formulations incorporating these resin products may be used over long periods of time to prepare plastisols, which formulations need no adjustment because of changes in these characteristics.

With regard to the catalyst system of this invention, the amounts of hydrogen peroxide catalyst and alkali metal formaldehyde sulfoxylate activator used may satisfactorily be varied within relatively wide limits. The activator generally is employed to the extent of about 0.003 to 3.0 percent, typically within the range of 0.01 to 0.02 percent, based on the weight of the monomeric materials in the reaction charge. In practice, the alkali metal formaldehyde sulfoxylate is usually introduced into the reaction zone with the initial charge. The hydrogen peroxide likewise may be introduced initially but oftentimes is introduced continuously or intermittently during the reaction, in an amount sufficient to provide the desired reaction rate and rate control.

The amount of hydrogen peroxide that generally may be used is 0.002 to 3.0 percent of the total weight of the monomer charge. However, high conversions of monomer can be realized with minimum induction periods and normal polymerization cycles employing from 0.002 to 0.015 percent of hydrogen peroxide, which catalyst amount is greatly reduced from that required in similar techniques using persulfate-type catalysts.

The emulsifier, which also may be referred to as a plastisol viscosity depressant since it effects this action concomitantly with the emulsifying action it provides may be employed within relatively wide quantity limits. The amounts of emulsifier indicated throughout the specification and appended claims are on the basis of 100 percent active matreial. Improved results are achieved when as little as 0.2 percent based upon the weight of the monomer or monomers to be reacted is employed; and, up to 2 percent on the same basis may be used. However, an amount between about 0.9 to 1.0 percent is especially suitable and is preferred.

As will be shown hereinafter by specific examples, the paste resins produced by the process of this invention exhibit markedly improved heat stability and significantly improved dispersion viscosity characteristics over like properties of resins prepared employing other catalysts in combination with similar emulsifiers. These resins are particularly suited to such applications as the high speed coating of cloth, fabrics, paper and the like, slush molding of a wide variety of household, industrial and novelty items and as a top coat for vinyl flooring products.

As indicated hereinabove, the preferred monomer is vinyl chloride. However, copolymers may be advantageously prepared in accordance with this invention. For example, copolymerizable mixtures containing vinyl chloride and up to 49 percent vinyl acetate, but preferably in the range of 5 to 10 percent vinyl acetate, may be employed. Other monomers copolymerizable with vinyl chloride, which may be used in accordance with this invention, include vinyl esters of other alkanoic acids, such as vinyl propionate, vinyl butyrate and the like; vinyl esters of aromatic acids, e.g., vinyl benzoate; esters of alkenoic acids, for example, those of unsaturated mono-carboxylic acids, such as methyl acrylate, ethyl acrylate, allyl acrylate, 2-ethyl hexyl acrylate and the corresponding esters of methacrylic acid; and esters of $\alpha,\beta$-dicarboxylic acids, for example, the methyl, ethyl, propyl, butyl, amyl, hexyl, heptyl, octyl, allyl, methallyl and phenyl esters of maleic, itaconic, fumaric acids, and the like. Amides, such as acrylamide and acrylanilide, and nitriles, such as acrylonitrile may also be suitably employed.

The following examples are given in order that those skilled in the art may more completely understand the invention and the preferred methods by which the same may be brought into effect.

EXAMPLE 1

A suitable polymer seed latex is prepared, utilizing the following materials:

| | |
|---|---|
| Water | 21 gals. |
| Sodium formaldehyde sulfoxylate | 0.022 lb. |
| Sodium tridecyl sulfate | 0.022 lb. |
| Vinyl chloride monomer | 100 lbs. |
| Hydrogen peroxide | 0.008 lb. |
| Sodium tridecyl sulfate | 0.80 lb. in 3 gals. of water. |

The water, at approximately room temperature, is delivered to a 50-gallon reactor, after which the sodium formaldehyde sulfoxylate and the 0.022 lb. portion of sodium tridecyl sulfate are added and thoroughly mixed with the water by agitation. The reactor is closed, held under vacuum for a short time, and subsequently purged with vinyl chloride to displace the air. The monomer is then charged to the reactor, the temperature of which is then raised, with continuous agitation, to about 110° to 125° F. and to a pressure equivalent to the vapor pressure of the monomer at these temperatures (about 90 to 140 p.s.i.g.). A portion of the hydrogen peroxide is added to initiate the reaction, and the balance is added slowly to maintain the reaction rate. Shortly after polymerization has been initiated, addition of the sodium tridecyl sulfate aqueous solution is begun and continued slowly throughout the reaction cycle. When the reaction has been completed (noted by a pressure drop of 20 to 40 pounds), the remaining monomer is stripped off. In this example, the reaction time is about 12 hours. The contents of the reactor comprise a polymer seed latex, containing approximately 38 to 40 percent solids.

EXAMPLE 2

Following the general procedure of Example 1, similar quantities of water, sodium formaldehyde sulfoxylate, 0.022 pound of sodium tridecyl sulfate, and 8 pounds of the polymer seed latex, prepared in Example 1, are charged to the reactor. The vinyl chloride monomer is added after the reactor has been purged with vinyl chloride. The hydrogen peroxide and the remainder of the sodium tridecyl sulfate are added as before.

Upon completion of polymerization, the latex is spray-dried and ground (put in micro-atomizer) to yield particulate vinyl chloride paste resin.

EXAMPLE 3

A polymer seed latex is prepared by following the general procedure of Example 1, with the exception that sodium metabisulfite and potassium persulfate are used in place of the sulfoxylate-peroxide catalyst components, as follows:

| | |
|---|---|
| Water | 21 gals. |
| Sodium metabisulfite | 0.044 lb. |
| Sodium tridecyl sulfate | 0.022 lb. |
| Vinyl chloride monomer | 100 lbs. |
| Potassium persulfate | 0.16 lb. |
| Sodium tridecyl sulfate | 0.80 lb. in 3 gals. water. |

EXAMPLE 4

The procedure of Example 2 is followed, with the exception that the seed latex product of Example 3 is used, and sodium metabisulfite and potassium persulfate are substituted in place of sodium formaldehyde sulfoxylate and hydrogen peroxide, respectively. The amounts of the catalyst components used are the same as those of Example 3. Spray drying of the resulting polymer latex yields particulate vinyl chloride paste resin.

EXAMPLE 5

A suitable polymer seed latex is prepared, according to the procedure outlined in Example 1, utilizing the following materials:

| | |
|---|---|
| Water | 21 gals. |
| Sodium formaldehyde sulfoxylate | 0.022 lb. |
| Sodium lauryl ether sulfate | 0.022 lb. |
| Vinyl chloride monomer | 100 lbs. |
| Hydrogen peroxide | 0.008 lb. |
| Sodium lauryl ether sulfate | 0.80 lb. in 3 gals. water. |

At the end of the reaction, the reaction mixture comprises a polymer seed latex, containing approximately 33 to 35 percent solids.

EXAMPLE 6

Following the general procedure of Example 2, the water, sodium formaldehyde sulfoxylate, 0.022 lb. of sodium lauryl ether sulfate and 8.0 lbs. of the polymer seed latex, prepared in Example 5, are charged to the reactor. The vinyl chloride monomer is added after the reactor has been purged with vinyl chloride. The hydrogen peroxide and the remainder of the sodium lauryl ether sulfate are added as before.

Upon completion of polymerization, the latex is spray-dried and ground (put in micro-atomizer) to yield particulate vinyl chloride paste resin.

EXAMPLE 7

A suitable polymer seed latex is prepared according to the procedure of Example 1, utilizing the following materials:

| | |
|---|---|
| Water | 21 gals. |
| Sodium metabisulfate | 0.044 lb. |
| Sodium lauryl ether sulfate | 0.022 lb. |
| Vinyl chloride monomer | 100 lbs. |
| Potassium persulfate | 0.016 lb. |
| Sodium lauryl ether sulfate | 0.8 lb. in 3 gals. water. |

EXAMPLE 8

The procedure of Example 2 is followed with the exception that the seed latex product of Example 7 is used and sodium metabisulfite and potassium persulfate are substituted in place of sodium formaldehyde sulfoxylate and hydrogen peroxide, respectively. Sodium lauryl ether sulfate is used as the emulsifier. The amounts of the catalyst components used are the same as those of Example 7. Spray drying of the resulting polymer latex yields particulate vinyl chloride paste resin.

EXAMPLE 9

A further example of the invention is provided by substituting 15 pounds of vinyl acetate monomer for a corresponding portion of vinyl chloride monomer in the procedures for preparing both the polymer seed latex and paste resin, as described in Examples 1 and 2, with the amounts of the other materials and the procedure being used as described. The vinyl chloride-vinyl acetate copolymer latex obtained is then processed to yield the particulate paste copolymer.

EXAMPLE 10

A further example of the invention is provided by substituting 15 pounds of vinyl acetate monomer for a corresponding portion of vinyl chloride monomer in the procedures for preparing both the polymer seed latex and paste resin, as described in Examples 3 and 4, with the amounts of the other materials and the procedure being used as described. The vinyl chloride-vinyl acetate copolymer latex obtained is then processed to yield the particulate paste copolymer.

EXAMPLE 11

This test evaluates the stability of the paste resin products of the previous examples to degradation by heat. For each product tested, 100 parts of resin are mixed with 60 parts of dioctyl phthalate plasticizer and 3 parts of stabilizer (barium-cadmium-zinc) in a No. 50 Hobart mixer for 15 minutes at 25° C. The resulting paste resin dispersion, i.e., plastisol, is poured into an aluminum mold, which is then placed in an air-circulating oven maintained at 375° F. At intervals of 12 minutes, 15 minutes, 18 minutes, etc. after oven exposure has started, the plastisol molding is inspected for discoloration.

Using this procedure, the results are as follows:

| Paste resin product | Catalyst used | Emulsifier used | Exposure time at 375° F. (before color change noted), minutes |
|---|---|---|---|
| Example 2 | Hydrogen peroxide-sodium formaldehyde sulfoxylate. | Sodium tridecyl sulfate | >21 |
| Example 4 | Sodium metabisulfite-potassium persulfate | Sodium tridecyl sulfate | 15 |
| Example 6 | Hydrogen peroxide-sodium formaldehyde sulfoxylate. | Sodium lauryl ether sulfate. | >18 |
| Example 8 | Sodium metabisulfite-potassium persulfate | Sodium lauryl ether sulfate. | 12 |
| Example 9 | Hydrogen peroxide-sodium formaldehyde sulfoxylate. | Sodium tridecyl sulfate | 18 |
| Example 10 | Sodium metabisulfite-potassium persulfate | Sodium tridecyl sulfate | 12 |

EXAMPLE 12

To compare dispersion viscosity characteristics of the paste resins of this invention at low shearing stress, the viscosities of plastisols [1] prepared from the products of the foregoing examples are indexed as follows, with the catalyst and emulsifier employed to prepare each product as designated in Example 11:

| Example | Viscosity [a] (poises) | | |
|---|---|---|---|
| | Initial [b] | 1 day | 7 days |
| 2 | 6.4 | 7.6 | 9.6 |
| 4 | 12.0 | 19.0 | 34.0 |
| 6 | 7.0 | 8.0 | 12.0 |
| 8 | 11.6 | 18.8 | 33.0 |
| 9 [c] | 4 | 6 | 10.0 |
| 10 [c] | 12.4 | 23.5 | 45.2 |

[a] Viscosity measured at 25° C., using a Brookfield Viscosimeter (Model RVT-200), with a No. 5 spindle, at 5 r.p.m.
[b] Measurement 2 hours after plastisol is prepared.
[c] Plastisol prepared with 100 parts dry resin plus 70 parts dioctyl phthalate mixed in a No. 50 Hobart mixer for 15 minutes at 25° C.

As the above values indicate, plastisols incorporating the resins prepared by employing the catalyst-emulsifier combination of this invention exhibit flow properties at low shear which are markedly reduced from those measured for plastisols incorporating resins prepared with a different catalyst system (persulfate-bisulfite) in combination with these emulsifiers.

EXAMPLE 13

To compare the dispersion viscosity characteristics of the paste resins of this invention at high shearing stress, viscosities of the plastisols [1] employed in the previous example are indexed as follows:

| Example | Viscosities [a] (poises) | |
|---|---|---|
| | 100 p.s.i.g. | 60 p.s.i.g. |
| 2 | 54.0 | 65.0 |
| 4 | 149.0 | 168.0 |
| 6 | 69.0 | 78.0 |
| 8 | 88.0 | 100.0 |
| 9 | 52.0 | 62.0 |
| 10 | 132.0 | 135.0 |

[a] Measured on 2-hour aged plastisol at 25° C., using a Severs Extrusion Rheometer (Model A100) with a medium-sized orifice (0.3 centimeter diameter).

As the above values indicate, plastisols incorporating the paste resins prepared by this invention exhibit flow properties at high shear which are markedly reduced from those observed for plastisols incorporating those resins prepared with the persulfate-bisulfite catalyst. Additionally, these products exhibit, with ageing, no significant change in rheological characteristics, e.g., in dilatency, thixotropy, and the like, being essentially insensitive to environmental changes. Thus, they may be used over long periods of time in particular applications with no adjustments in plastisol formulation recipes being required.

EXAMPLE 14

A further example of the invention is provided by substituting 15 pounds of methyl methacrylate monomer for a corresponding portion of vinyl chloride monomer in the procedures for preparing both a polymer seed latex and paste resin as described in Examples 1 and 2, with the amounts of the other materials and the procedure being used as described. The vinyl chloride-methyl methacrylate copolymer latex obtained is processed to yield the particulate paste copolymer. This copolymer product is similar in heat stability characteristics and dispersion viscosity properties to the copolymer product of Example 9.

It is to be understood that, although the invention has been described with specific reference to particular embodiments thereof, it is not to be so limited, since changes and alterations therein may be made which are within the full intended scope of this invention as defined in the appended claims.

What is claimed is:

1. A process for preparing polymeric materials in an aqueous medium from a monomer selected from the group consisting of vinyl chloride and mixtures thereof with at least one other monomer polymerizable therewith, which process comprises contacting the said monomer with about 0.002 percent to 3 percent, by weight of the monomer, of a hydrogen peroxide catalyst, about 0.003 percent to 3 percent, by weight of the monomer, of an alkali metal formaldehyde sulfoxylate and about 0.2 percent to 1.5 percent, by weight of the monomer, of a fatty acid sulfate salt of the formula $$R-(OR')_nOSO_3Y$$

wherein R' is a saturated aliphatic hydrocarbyl radical containing 1 to 3 carbon atoms; $n$ is an integer from 0 to 10; R is an aliphatic hydrocarbyl radical containing 6 to 20 carbon atoms; and Y is a cation selected from the group consisting of alkali metals, alkaline earth metals, ammonium and alkanol amines containing up to 6 carbon atoms.

2. The process of claim 1 wherein the hydrogen peroxide is added in measured increments during the polymerization reaction, such increments being sufficient to provide the desired reaction rate and rate control.

3. The process of claim 1 wherein the reaction temperature is within the range of 100° to 140° F.

4. The process of claim 1 wherein the fatty acid sulfate salt is sodium tridecyl sulfate.

5. The process of claim 1 wherein the fatty acid sulfate salt is sodium lauryl ether sulfate.

6. The process of claim 1 wherein the monomer is a mixture of vinyl chloride and at least one monomer selected from the group consisting of vinyl esters of lower alkanoic acids and alkyl esters of alkenoic acids.

7. The process of claim 6 wherein the monomer mixture contains at least 50 percent vinyl chloride, by weight.

8. The process of claim 6 wherein the monomer mix-

[1] 100 parts dry paste resin plus 60 parts dioctyl phthalate mixed in a No. 50 Hobart mixer for 15 minutes at 25° C.

ture contains at least 90 percent vinyl chloride, by weight.

9. The process of claim 6 wherein the vinyl ester of a lower alkanoic acid is vinyl acetate.

10. The process of claim 6 wherein the alkyl ester of an alkenoic acid is methyl methacrylate.

11. The process of claim 6 wherein the alkyl ester of an alkenoic acid is ethyl acrylate.

12. A process for preparing polymeric materials in an aqueous medium from a monomer selected from the group consisting of vinyl chloride and mixtures thereof with at least one other monomer polymerizable therewith, which process comprises contacting the said monomer with about 0.002 percent to 3 percent, by weight of the monomer, of a hydrogen peroxide catalyst, about 0.003 percent to 3 percent, by weight of the monomer, of sodium formaldehyde sulfoxylate, and about 0.2 percent to 1.5 percent, by weight of the monomer, of sodium tridecyl sulfate.

13. The process of claim 12 wherein the hydrogen peroxide is added in measured increments during the polymerization reaction, such increments being sufficient to provide the desired reaction rate and rate control.

14. The process of claim 12 wherein the reaction temperature is within the range of 100° to 140° F.

15. The process of claim 12 wherein the monomer is a mixture of vinyl chloride and at least one monomer selected from the group consisting of vinyl esters of lower alkanoic acids and alkyl esters of alkenoic acids.

16. The process of claim 12 wherein the monomer mixture contains at least 50 percent vinyl chloride, by weight.

17. The process of claim 12 wherein the monomer mixture contains at least 90 percent vinyl chloride, by weight.

18. The process of claim 12 wherein the vinyl ester of a lower alkanoic acid is vinyl acetate.

19. The process of claim 12 wherein the alkyl ester of an alkenoic acid is methyl methacrylate.

20. The process of claim 12 wherein the alkyl ester of an alkenoic ester is ethyl acrylate.

21. Paste resin products prepared by the process of claim 1.

22. Paste resin products prepared by the process of claim 4.

23. Paste resin products prepared by the process of claim 5.

24. Paste resin products prepared by the process of claim 6.

25. Paste resin products prepared by the process of claim 12.

References Cited by the Examiner

UNITED STATES PATENTS

| | | | |
|---|---|---|---|
| 2,404,791 | 7/1946 | Coffman et al. | 260—29.6 |
| 2,560,694 | 7/1951 | Howard | 260—80 |
| 2,795,564 | 6/1957 | Conn et al. | 260—29.6 |
| 2,936,295 | 5/1960 | Brodkey et al. | 260—29.6 |
| 3,120,505 | 2/1964 | McCubbin et al. | 260—87.1 |

FOREIGN PATENTS 829,063  1/1952  Germany.

SAMUEL H. BLECH, *Primary Examiner.*

MURRAY TILLMAN, *Examiner.*

UNITED STATES PATENT OFFICE
CERTIFICATE OF CORRECTION

Patent No. 3,317,495                                                                   May 2, 1967

William D. Jones et al.

It is hereby certified that error appears in the above numbered patent requiring correction and that the said Letters Patent should read as corrected below.

Column 5, Example 3, in the table, line 5 thereof, for "0.16 lb." read -- 0.016 lb. --.

Signed and sealed this 21st day of November 1967.

(SEAL)
Attest:

Edward M. Fletcher, Jr.                                   EDWARD J. BRENNER
Attesting Officer                                               Commissioner of Patents